(12) United States Patent
Daito et al.

(10) Patent No.: US 8,807,546 B2
(45) Date of Patent: Aug. 19, 2014

(54) FLUID FILLED VIBRATION DAMPING DEVICE

(71) Applicant: Tokai Rubber Industries, Ltd., Aichi-ken (JP)

(72) Inventors: Hironori Daito, Gifu (JP); Mutsumi Muraoka, Aichi (JP); Hironori Koyama, Aichi (JP)

(73) Assignee: Tokai Rubber Industries, Ltd., Aichi (JP)

( * ) Notice: Subject to any disclaimer, the term of this patent is extended or adjusted under 35 U.S.C. 154(b) by 27 days.

(21) Appl. No.: 13/788,351

(22) Filed: Mar. 7, 2013

(65) Prior Publication Data

US 2013/0264756 A1    Oct. 10, 2013

(30) Foreign Application Priority Data

Apr. 6, 2012 (JP) .................................. 2012-086998

(51) Int. Cl.
*F16F 13/08* (2006.01)
*F16F 13/10* (2006.01)

(52) U.S. Cl.
CPC .............. *F16F 13/08* (2013.01); *F16F 13/108* (2013.01)
USPC ................................................. 267/140.13

(58) Field of Classification Search
USPC ....................................... 267/140.13–140.14
See application file for complete search history.

(56) References Cited

U.S. PATENT DOCUMENTS

| 6,276,673 | B1 | 8/2001 | Hibi et al. | |
| 2005/0206056 | A1* | 9/2005 | Maeno et al. | 267/140.13 |
| 2006/0220289 | A1* | 10/2006 | Okumura et al. | 267/140.13 |
| 2007/0001355 | A1* | 1/2007 | Maeno et al. | 267/140.13 |
| 2011/0042873 | A1* | 2/2011 | Yamamoto et al. | 267/140.14 |

FOREIGN PATENT DOCUMENTS

| JP | 7-180743 | 7/1995 |
| JP | 2804778 | 7/1998 |
| JP | 11-153178 | 6/1999 |
| JP | 2007-198541 | 8/2007 |

* cited by examiner

*Primary Examiner* — Christopher Schwartz
(74) *Attorney, Agent, or Firm* — Greenblum & Bernstein P.L.C.

(57) ABSTRACT

A fluid filled vibration damping device including: a first mounting member; a second mounting member having a cylindrical portion; and a main rubber elastic body elastically connecting the first and second mounting members. The first mounting member is fixed to one end of the main rubber elastic body, and an insertion metal fitting in a cylindrical shape is fixed onto an outer peripheral face of another end thereof, and the cylindrical portion of the second mounting member is bonded by pressure to the insertion metal fitting with a sealing rubber in between in a fluid-tight manner. The insertion metal fitting is provided with an inward protrusion where part of a wall portion protrudes inward. A sealing rubber storage space is formed between the inward protrusion and the cylindrical portion of the second mounting member.

5 Claims, 4 Drawing Sheets

FLUID FILLED VIBRATION DAMPING DEVICE

INCORPORATED BY REFERENCE

The disclosure of Japanese Patent Application No. 2012-086998 filed on Apr. 6, 2012 including the specification, drawings and abstract is incorporated herein by reference in its entirety.

BACKGROUND OF THE INVENTION

1. Field of the Invention

The present invention relates to a vibration damping device to be used, for example, for an automobile engine mount, especially to a fluid filled vibration damping device using vibration effects based on the flow behavior of a non-compressible fluid sealed therein.

2. Description of the Related Art

Conventionally, as a vibration damping device interposed between the members constituting a vibration transmission system that connects said members to each other or supports them in a vibration-damping manner, there has been known a fluid filled vibration damping device using the flow behavior of a non-compressible fluid sealed therein, which is widely used as an engine mount and the like. This fluid filled vibration damping device has a structure where a first mounting member and a second mounting member are elastically connected by a main rubber elastic body, while a pressure-receiving chamber and an equilibrium chamber are formed in which a non-compressible fluid is sealed on opposite sides of a partition member supported by the second mounting member, and further, an orifice passage is formed to connect said pressure-receiving chamber and equilibrium chamber with each other. For example, the one disclosed in U.S. Pat. No. 6,276,673 is such a device.

In case of a fluid filled vibration damping device with such a conventional structure, the first mounting member is fixed to the smaller-diameter end, which is one end of the main rubber elastic body in an approximate form of a truncated cone, while an insertion metal fitting in a cylindrical shape is fixed onto the outer peripheral face of the larger-diameter end, which is the other end of the main rubber elastic body, and fluid tightness of the pressure-receiving chamber and equilibrium chamber installed therein is secured by means of having the cylindrical portion of the second mounting member bonded by pressure to the insertion metal fitting with a sealing rubber in between in a fluid-tight manner.

Meanwhile, a large tensile load may be applied repeatedly to a fluid filled vibration damping device in a direction of separating the first and second mounting members away from each other, depending on the aspect of how they are mounted. Once such a tensile load is applied, the main rubber elastic body is so much deformed by tension inward in the radial direction that a comparatively large tensile spring force is required for the main rubber elastic body.

However, since the main rubber elastic body is fitted into the second mounting member with the insertion metal fitting in a cylindrical shape in between being fixed onto the outer peripheral face of the larger-diameter end, only the outer periphery of the larger-diameter end of the main rubber elastic body is bound and retained by the insertion metal fitting extending parallel to the input direction of the tensile load. Therefore, when a large tensile load is applied between the first and second mounting members, the inner periphery of the larger-diameter end of the main rubber elastic body is easily pulled and displaced in the direction of the first mounting member (upward), so that required amount of tensile spring force could not be obtained in some cases.

Also considered a problem was a defect wherein the inner periphery of the larger-diameter end of the main rubber elastic body displaced upward by the inputted tensile load collides against the partition member to make striking noises when the end face of the inner periphery is brought back to the initial position by the elastic force upon release of the inputted tensile load.

SUMMARY OF THE INVENTION

It is therefore one object of the present invention to provide a fluid filled vibration damping device with a novel structure that is capable of enhancing the tensile spring force against the tensile load inputted between the first and second mounting members while securely obtaining the sealing property between the cylindrical portion of the second mounting member and the insertion metal fitting.

A first mode of the present invention provides a fluid filled vibration damping device including: a first mounting member; a second mounting member having a cylindrical portion; a main rubber elastic body elastically connecting the first and second mounting members; a partition member supported by the second mounting member; a pressure-receiving chamber in which a non-compressible fluid is sealed that is located on one side across from the partition member and whose wall is partially defined by the main rubber elastic body; an equilibrium chamber in which the non-compressible fluid is sealed that is located on the other side across from the partition member and whose wall is partially defined by a flexible film; and an orifice passage that connects the pressure-receiving chamber and the equilibrium chamber to each other, wherein the first mounting member is fixed to one end of the main rubber elastic body, and an insertion metal fitting in a cylindrical shape is fixed onto an outer peripheral face of the other end thereof, and the cylindrical portion of the second mounting member is bonded by pressure to the insertion metal fitting with a sealing rubber in between in a fluid-tight manner, wherein the insertion metal fitting is provided with an inward protrusion where part of a wall portion protrudes inward, and wherein a sealing rubber storage space is formed between the inward protrusion and the cylindrical portion of the second mounting member.

In the fluid filled vibration damping device with a structure according to the present invention, the insertion metal fitting fixed onto the outer peripheral face of the main rubber elastic body is provided with the inward protrusion that protrudes inward of the insertion metal fitting. This allows the inward protrusion to be fitted into the main rubber elastic body to increase the area to be constrained by the insertion metal fitting to be able to support and retain the main rubber elastic body by the inward protrusion extending in a direction transverse or orthogonal to the tension direction of the main rubber elastic body in the event a large tensile load is exerted between the first and second mounting members. As a result, it becomes possible to favorably prevent any upward displacement of not only the outer periphery but also the inner periphery of the main rubber elastic body upon input of a tensile load thereon, thus enhancing the tensile spring force of the main rubber elastic body and preventing any striking noise from being generated by the main rubber elastic body returning from the displaced position.

In addition, when the cylindrical portion of the second mounting member is bonded by pressure to the insertion metal fitting by a squeeze processing method and the like taking advantage of the space formed between the inward protrusion and the cylindrical portion of the second mounting member as a sealing rubber storage space, excess sealing rubber subject to compressive deformation between the insertion metal fitting and the cylindrical portion can be let out to the sealing rubber storage space. This prevents excessive load caused by entrapment of the sealing rubber clamped between the cylindrical portion and the insertion metal fitting from being unevenly applied to the insertion metal fitting, thus preventing the insertion metal fitting from being locally deformed. As a result, the sealing rubber can be retained with a given tightening allowance between the cylindrical portion and insertion metal fitting, which enhances the sealing performance between them.

The shape of the inward protrusion of the insertion metal fitting is not particularly limited as long as the tensile spring force required for the main rubber elastic body is obtained. For example, it can be either in a form of protruding inward of the insertion metal fitting in a direction orthogonal to the axis thereof, or protruding inward of the insertion metal fitting in a direction obliquely crisscrossing the axis thereof. Also, the inward protrusion can be provided in any location in the axial direction of the insertion metal fitting, either in the middle portion in the axial direction, or at one end (bottom end in the axial direction) of the partition member side. Further, the inward protrusion should preferably be provided in a constant shape all along the circumferential direction of the insertion metal fitting, but it can also be provided at multiple locations separated from each other in the circumferential direction or at multiple locations in the axial direction of the insertion metal fitting.

A second mode of the present invention provides the fluid filled vibration damping device according to the first mode, wherein the inward protrusion of the insertion metal fitting is formed in a tapered shape extending inward while sloping in an axial direction of the insertion metal fitting.

According to this mode, a local increase in rigidity of the insertion metal fitting in a transaxial direction can be favorably avoided as compared to the situation where the inward protrusion is extended inward, orthogonally to the axis of the insertion metal fitting. Therefore, in bonding the cylindrical portion of the second mounting member by pressure to the insertion metal fitting, the load can be applied thereto relatively evenly, so that in part due to the effects of the sealing rubber storage space, the insertion metal fitting will be prevented from being locally deformed. As a result, it becomes possible to effectively maintain the sealing property between the cylindrical portion and insertion metal fitting.

A third mode of the present invention provides the fluid filled vibration damping device according to the first or second mode, wherein the inward protrusion in the tapered shape is provided at an end of the insertion metal fitting in the axial direction thereof on a side away from the first mounting member.

According to this mode, the inward protrusion is provided at the bottom end of the insertion metal fitting in the axial direction on the side away from the first mounting member. This makes sure that the volume of the main rubber elastic body constrained by the inward protrusion will be large enough. Therefore, it is possible to produce a large tensile spring force at the main rubber elastic body, thus enabling to enhance the tensile spring force as well as to establish a stable sealing in more favorable way. Also, the bottom end of the main rubber elastic body is prevented from being lifted upward when a tensile load is inputted by means of constraining the bottom end of the main rubber elastic body in the axial direction on the side of the partition member so that generation of striking noises caused by the main rubber elastic body returning from the lifted position can be inhibited more effectively.

A fourth mode of the present invention provides the fluid filled vibration damping device according to any one of the first through third modes, wherein in a transaxial direction of the insertion metal fitting, a protruding length at a protruded end of the inward protrusion is set within a range of 3 to 15% of an inner diameter of the insertion metal fitting.

According to this mode, improvement effects of the tensile spring force of the main rubber elastic body and of the sealing performance between the second mounting member and the insertion metal fitting can both be achieved to a high degree; that is, if the protruding length of the inward protrusion is less than 3% of the inner diameter of the insertion metal fitting, the area in the main rubber elastic body to be constrained by the inward protrusion gets too small to be able to obtain an effective tensile spring force, and the sealing rubber storage space gets so small that the sealing rubber clamped between the cylindrical portion and insertion metal fitting cannot be let out enough, which causes uneven deformation of the insertion metal fitting that may damage the sealing. On the other hand, if the protruding length of the inward protrusion is more than 15% of the inner diameter of the insertion metal fitting, the material thereof is wasted, and the protrusion enters into the main rubber elastic body more than necessary and even reaches the pressure-receiving chamber to damage the function thereof. Especially, if the inward protrusion is located in the middle portion in the axial direction of the insertion metal fitting, the spring characteristics of the main rubber elastic body interposed between the inward protrusion and partition member may possibly be compromised.

A fifth mode of the present invention provides the fluid filled vibration damping device according to any one of the first through fourth modes, wherein a volume of the sealing rubber storage space is made at least 3% of a volume of the sealing rubber clamped between the cylindrical portion of the second mounting member and the insertion metal fitting.

According to this mode, it is possible to well absorb the compressive deformation of the sealing rubber clamped between the cylindrical portion of the second mounting member and the insertion metal fitting, thus enabling to favorably prevent deformation of the insertion metal fitting caused by a local increase in the tightening margin. As a result, enough sealing between the cylindrical portion and insertion metal fitting can be obtained securely.

According to the present invention, a sealing rubber storage space was formed between the inward protrusion and the cylindrical portion of the second mounting member by providing the inward protrusion that protrudes inward from the insertion metal fitting fixed onto the outer peripheral face at the opposite end of the first mounting member of the main rubber elastic body. This allows the inward protrusion to constrain the main rubber elastic body with a transaxial component of the insertion metal fitting, thus enhancing the tensile spring force of the main rubber elastic body. In addition, the sealing rubber compressed between the cylindrical portion of the second mounting member and the insertion metal fitting can be let out into the sealing rubber storage space to apply pressure from the cylindrical portion almost evenly to the insertion metal fitting, thus enabling to securely obtain sealing property between the cylindrical portion and the insertion metal fitting by preventing uneven deformation of the insertion metal fitting.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
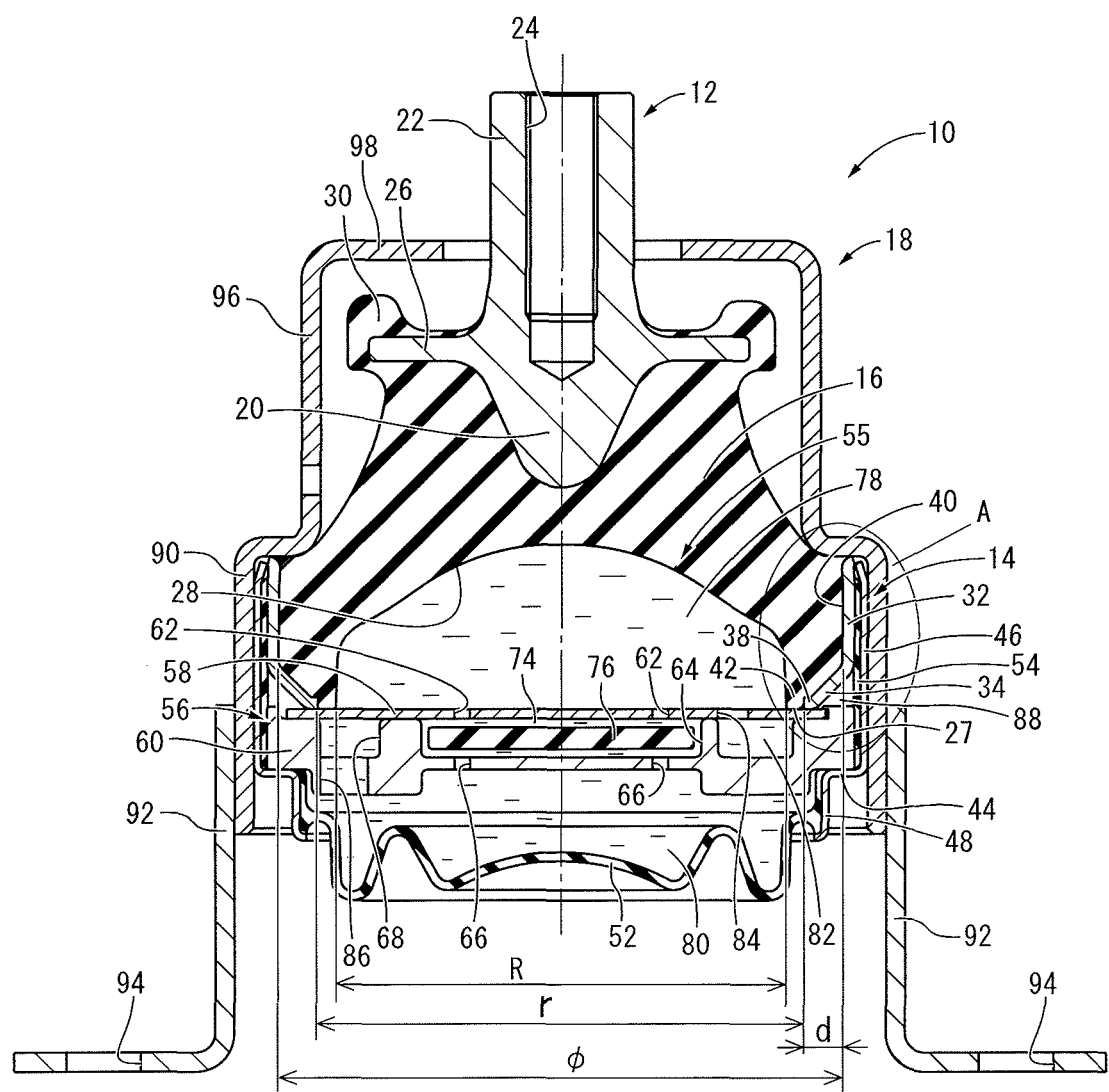
FIG. 1 is an elevational view in axial or vertical cross section of a fluid filled vibration damping device in the form of an engine mount as a first embodiment of the present invention.

First, FIG. 1 shows an engine mount 10 for motor vehicles as a fluid filled vibration damping device related to a first embodiment of the present invention. This engine mount 10 has a basic structure where the first mounting member 12 and the second mounting member 14 are elastically connected by the main rubber elastic body 16. The first mounting member 12 is fixed to a power unit, not shown in a figure, as one vibrating member that is connected in a vibration damping manner. Meanwhile, the second mounting member 14 is fixed, via a metal bracket 18, to a vehicular body, not shown in a figure as the other member that is connected in a vibration damping manner. This allows the engine mount 10 to be installed between the vehicular body and the power unit so as to support the power unit in a vibration damping manner relative to the vehicular body. In the description hereinbelow, the words "vertical direction" and "axial direction" mean the up and down direction in FIG. 1, which is the main input direction of vibration.

More specifically, the first mounting member 12 is a high-rigidity member made of metal such as iron or aluminum alloy and the like having a main body 20 in a shape of a reverse truncated cone. From the larger-diameter end of this main body 20, a bolt fixing portion 22 protrudes upward in the axial direction to be integrally formed therewith, while the first mounting member 12 is fixed to the power unit with a fixing bolt, not shown in a figure, that is screwed into a screw hole 24 formed in the bolt fixing portion 22. Meanwhile, a stopper portion 26 in an annular disk shape extending outward from the outer peripheral face of the larger-diameter end of the main body 20 is integrally formed with the first mounting member 12.

To the first mounting member 12, the main rubber elastic body 16 is bonded by vulcanization. The main rubber elastic body 16 is in an approximate form of a truncated cone, as a whole, with a large diameter increasing downward and has a concave portion 28 in a reverse bowl shape opening up toward a larger-diameter end face 27. Then, the first mounting member 12 is bonded by vulcanization to the main rubber elastic body 16 located on the same central axis under a situation where the first mounting member 12 is inserted downward in the axial direction into the smaller-diameter end surface of the main rubber elastic body 16. Meanwhile, the main rubber elastic body 16 comes around to the top of the stopper portion 26 of the first mounting member 12, and a cushion rubber 30 protruding upward in the axial direction from the stopper portion 26 is integrally formed with the main rubber elastic body 16.

Also, to the outer peripheral face of the larger-diameter end of the main rubber elastic body 16, an insertion metal fitting 32 is overlappingly bonded by vulcanization. The insertion metal fitting 32, like the first mounting member 12, is made of a high-rigidity material in an approximate form of a thin-walled large diameter cylinder. As shown in the enlarged view of FIG. 2, an inward protrusion 34 is formed at the bottom end of the insertion metal fitting 32 in the axial direction (vertical direction in FIG. 2) away from the first mounting member 12 in the axial direction. The inward protrusion 34 is formed as part of a wall portion 36 of the insertion metal fitting 32 protruding inward thereof in the transaxial direction, and in this embodiment, the bottom end of the wall portion 36 is made in a tapered shape extending inward in the transactional direction of the insertion metal fitting 32 while sloping in the axial direction of the insertion metal fitting 32, and is formed all the way to the bottom edge of the insertion metal fitting 32 in its axial direction. This makes the insertion metal fitting 32 in a cylindrical shape extending in the axial direction with given inner and outer dimensions at the upper portion in the axial direction where the inward protrusion 34 is not formed, and at the same time, in a tapered shape gradually reducing the inner and outer dimensions as it goes downward at the lower portion in the axial direction where the inward protrusion 34 is formed. Meanwhile, the inward protrusion 34 is formed all along the periphery of the insertion metal fitting 32, which has a constant cross-section all around the circumference.

In the transaxial direction of the insertion metal fitting 32 (horizontal direction in FIG. 1), the inward protruding length of a protruded end 38 of the inward protrusion 34 from an inner surface 40 of the insertion metal fitting 32 is preferably set in a range of 3% to 15% of the inner diameter 'ø' of the insertion metal fitting 32 where the inward protrusion 34 is not formed, and more preferably set in a range of 5% to 10% thereof. This is because, if the protruding length 'd' of the inward protrusion 34 is smaller than 3% of the inner diameter 'ø' of the insertion metal fitting 32, there is a risk that improved effects of the tensile spring force of the main rubber elastic body 16 (described later) may not be fully exerted, while a sealing rubber storage space 88 (described later) gets so small that the let-out effect required for a sealing rubber 54 may not be fully exerted. On the contrary, if the protruding length is larger than 15% of the inner diameter 'ø' of the insertion metal fitting 32, the insertion metal fitting 32 would reach a pressure-receiving chamber 78 (described later) to damage the functions thereof.

The inner surface 40 of the insertion metal fitting 32 is bonded by vulcanization to the outer peripheral face of the larger-diameter end of the main rubber elastic body 16 all the way around. This allows the main rubber elastic body 16 to be formed as an integrally vulcanization molded component having the first mounting member 12 and the insertion metal fitting 32. The opening diameter 'r' at the bottom end of the insertion metal fitting 32 is made larger than the opening diameter 'R' of the concave portion 28 at the larger-diameter end face 27 of the main rubber elastic body 16. This allows an abutting portion 42 to be formed at the larger-diameter end of the main rubber elastic body 16 all along the circumference extending inward from the inward protrusion 34 in the radial direction of the insertion metal fitting 32.

Meanwhile, the second mounting member 14, having an approximate form of a large-diameter cylinder as a whole, is in an overall shape of a stepped cylinder with a step portion 44 formed in the middle in the axial direction. The upper side in the axial direction across from the step portion 44 is made to be a larger-diameter portion 46 while the lower side is made to be a smaller-diameter portion 48 with a diameter smaller than that of the larger-diameter portion 46. As evident from FIG. 2, an inward inclining portion 50 protruding slightly inward in the radial direction is integrally formed at the opening edge on the side of the larger-diameter portion 46. These larger-diameter portion 46 and smaller-diameter portion 48 comprise the cylindrical portion of the second mounting member 14.

Also, in the smaller-diameter portion 48 of the second mounting member 14, a diaphragm 52, as a flexible film, is arranged so as to be stored inside. The diaphragm 52 is composed of a thin rubber film in an approximate shape of a disc as a whole, and is provided with flexibility to readily allow deformation. This diaphragm 52 is arranged so as to expand approximately in a transaxial direction within the smaller-diameter portion 48, the outer periphery edge of which is bonded by vulcanization to the smaller-diameter portion 48. This allows the second mounting member 14 to be enclosed in a fluid-tight manner by the diaphragm 52 on the side of the smaller-diameter portion 48. In addition, along the inner peripheral face of the second mounting member 14, the sealing rubber 54 integrally formed with the diaphragm 52 is formed so as to cover at least the inner peripheral faces of the larger-diameter portion 46 and smaller-diameter portion 48. The sealing rubber 54 is formed so as to cover the inner surface of the larger-diameter portion 46 except the inward inclining portion 50.

By means of inserting from outside such larger-diameter portion 46 of the second mounting member 14 onto the insertion metal fitting 32 bonded by vulcanization to the main rubber elastic body 16 and applying a diameter reducing process such as the all-around crimping to the second mounting member 14, the larger-diameter portion 46 is bonded by pressure to the insertion metal fitting 32 via the sealing rubber 54. This allows the second mounting member 14 to be enclosed in a fluid-tight manner by the main rubber elastic body 16 on the side of the larger-diameter portion 46.

Then, by enclosing the spaces on the side of the larger-diameter portion 46 and smaller-diameter portion 48 of the second mounting member 14 in a fluid-tight manner by the main rubber elastic body 16 and the diaphragm 52, respectively, a fluid chamber 55 is formed between the opposing surfaces of the main rubber elastic body 16 and the diaphragm 52, closed to the outside and filled with non-compressible fluid sealed therein. The non-compressible fluid sealed in the fluid chamber 55 is not limited to a particular one, but for example, water, alkylene glycol, polyalkylene glycol, silicone oil, or the compound thereof and the like is preferably used. Further, in order to favorably obtain the vibration damping effect based on the flow behavior of the fluid (described later), it is preferable to use a fluid of low viscosity at 0.1 Pa·s or lower.

In the fluid chamber 55, a partition member 56 is arranged. The partition member 56 is formed in an approximate shape of a thick disc, as a whole, with a structure where an upper partition member 58 and a lower partition member 60 are overlapped. Press-mold products and die-cast mold products, for example, can be used as these upper partition member 58 and lower partition member 60, but injection mold products and the like made of hard synthetic resin can also be used.

The upper partition member 58 is formed in a disc shape with a constant thickness. At the center of the upper partition member 58, a plurality of upper connection holes 62 are provided in penetration thereof.

The lower partition member 60 is in a thin disc shape at the center while the outer periphery is formed in a thick annular shape. At the center of the lower partition member 60, a housing space 64 is formed in a circular shape that opens upward on the basis of the thin annular disk portion, and a plurality of lower connection holes 66 are provided through a bottom wall of the housing space 64. Also, at the thick annular portion along the outer periphery, a peripheral groove 68 is formed opening upward and extending in a circumferential direction for less than a full circle. Further, on the upper face of the lower partition member 60, a fitting concave 70 (see FIG. 2) is formed in a circular shape with a slightly larger diameter than that of the upper partition member 58 with approximately the same depth as that of the upper partition member 58. At the upper edge along the inner peripheral face of the fitting concave 70, a latching protrusion 72 is partially formed in the circumferential direction of the fitting concave 70 slightly protruding inward therefrom.

Figure 2:
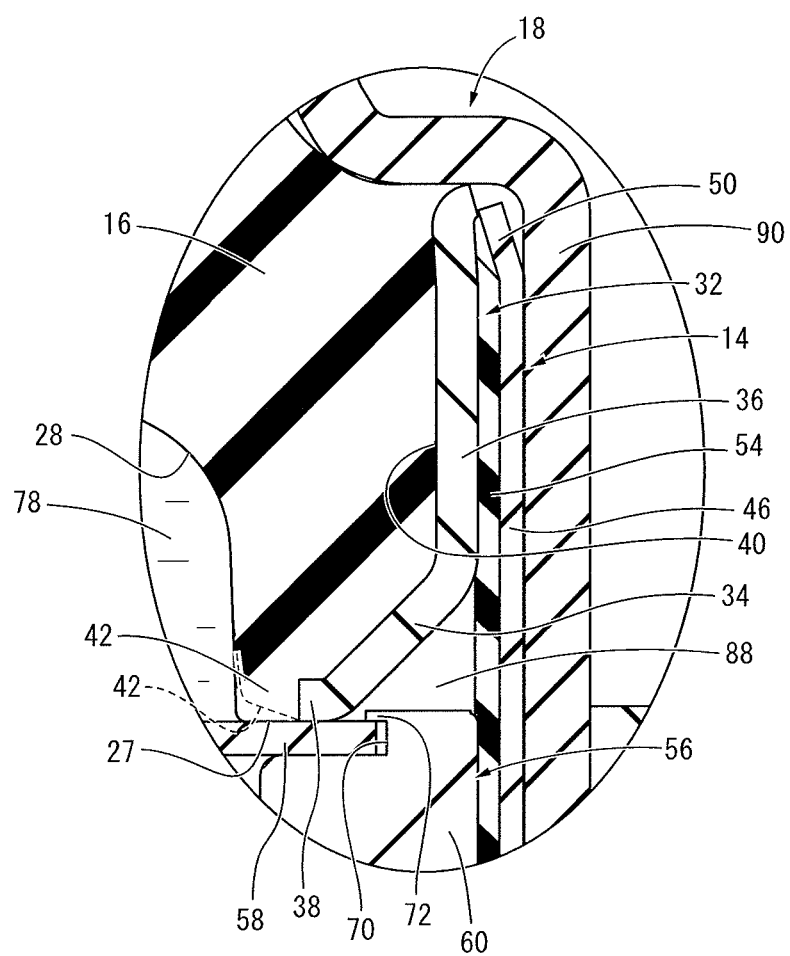
FIG. 2 is an enlarged view of Part A in FIG. 1.

Then, the upper partition member 58 is overlapped from above onto the lower partition member 60 in its axial direction in a way of being inserted into the fitting concave 70 of the lower partition member 60. As shown in FIG. 2, the outer periphery edge of the upper partition member 58 is fixed to the lower partition member 60 by being partially clamped in the circumferential direction between the bottom face of the fitting concave 70 and the latching protrusion 72. This allows the housing space 64 of the lower partition member 60 to be covered at its opening by the upper partition member 58 so as to make a circular storage space 74 extending in the transaxial direction with a constant depth (inner measurement in the axial direction). A rubber plate 76 in a disc shape is stored in the storage space 74 in a manner displaceable in the vertical direction.

The partition member 56 is fixed to the second mounting member 14 being supported thereby in such a way that each peripheral edge of the upper partition member 58 and lower partition member 60 is clamped between the abutting portion 42 of the main rubber elastic body 16 as well as the insertion metal fitting 32 and the step portion 44 of the second mounting member 14. Then, the fluid chamber 55 is divided into upper and lower sides in the axial direction by the partition member 56, above which the pressure-receiving chamber 78 is formed to receive vibration inputs and whose wall is partially defined by the main rubber elastic body 16, while on the lower side of the partition member 56, an equilibrium chamber 80 is formed and whose wall is partially defined by the diaphragm 52 to allow for a volume variation.

Also, the upward opening of the peripheral groove 68 formed in the lower partition member 60 is covered by the upper partition member 58 by overlapping the upper partition member 58 onto the lower partition member 60 to form an orifice passage 82 that extends about half way around the circle in the circumferential direction. One end of the orifice passage 82 opens up to the pressure-receiving chamber 78 via a connection hole 84 made through the upper partition member 58, while the other end opens up to the equilibrium chamber 80 via a connection hole 86 made through the lower partition member 60. This allows the pressure-receiving chamber 78 and equilibrium chamber 80 to be connected to each other via the orifice passage 82. Especially in this embodiment, the orifice passage 82 is tuned to a low frequency range equivalent to the engine shake. This makes it possible to effectively produce the vibration damping effects such as a damping effect against vibrations in a low frequency range including those of engine shake due to the flow behavior such as resonance action of the fluid that is forced to flow via the orifice passage 82 based on relative pressure changes between the pressure-receiving chamber 78 and equilibrium chamber 80.

Moreover, the pressure in the pressure-receiving chamber 78 is exerted to the top surface of the rubber plate 76 in the storage space 74 via the upper connection holes 62. On the other hand, the pressure in the equilibrium chamber 80 is exerted to the bottom surface of the rubber plate 76 in the storage space 74 via the lower connection holes 66. In other words, according to this embodiment, a liquid pressure absorption mechanism is configured in a way that the rubber plate 76 is arranged to be stored in a displaceable manner in the storage space 74 formed by the upper partition member 58 and lower partition member 60.

Assembly, to the second mounting member 14, of the partition member 56 as well as the integrally vulcanization molded component of the main rubber elastic body 16 provided with the first mounting member 12 and insertion metal fitting 32 is performed in such a way, for example, that the partition member 56 is inserted into the larger-diameter portion 46 of the second mounting member 14 to be latched against the step portion 44, and the integrally vulcanization molded component of the main rubber elastic body 16 is further inserted into the larger-diameter portion 46 to be latched against the partition member 56 in a non-compressible fluid. Then, the larger-diameter portion 46 is bonded by pressure to the insertion metal fitting 32 fixed to the partition member 56 and main rubber elastic body 16 via the sealing rubber 54 in a fluid-tight manner, by means of applying a diameter reducing process to the second mounting member 14.

This allows the larger-diameter end face 27 of the main rubber elastic body 16 and the bottom edge of the insertion metal fitting 32 to be assembled to the second mounting member 14 keeping contact with the upper partition member 58 of the partition member 56. Then, the sealing rubber storage space 88 is formed between the inward protrusion 34 and the larger-diameter portion 46 by means of arranging the inward protrusion 34 of the insertion metal fitting 32 so as to gradually move away from the larger-diameter portion 46 of the second mounting member 14 as it goes downward in the axial direction. The sealing rubber storage space 88 is continuously formed all around the circumference with an approximate triangular cross-section enclosed by the inward protrusion 34 of the insertion metal fitting 32, the larger-diameter portion 46 and the partition member 56. Then, part of the sealing rubber 54 is stored within the sealing rubber storage space 88.

The volume of the sealing rubber storage space 88 is preferably set at not less than 3%, and more preferably at 5% or more of the volume of the sealing rubber 54. This is because, if the volume of the sealing rubber storage space 88 is less than 3% of the volume of the sealing rubber 54, there is a risk that the let-out amount of the sealing rubber 54 (described later) cannot be well absorbed.

In addition, to the second mounting member 14, the metal bracket 18 is fixed at the larger-diameter portion 46. The metal bracket 18, being provided with an outer fitting portion 90 in a thick cylinder shape, is fixed from outside to the larger-diameter portion 46 of the second mounting member 14 at the outer fitting portion 90. Also, along the outer peripheral face of the outer fitting portion 90, a plurality of fixing plates 92 are welded thereto, extending downward as well as outward. The fixing plates 92 are provided with bolt through-holes 94 and are fixed to a vehicular body, not shown in a figure, by being overlapped onto the vehicular body where fixing bolts, not shown in a figure, are inserted through the bolt through-holes 94. This allows the second mounting member 14 to be fixed to the vehicular body via the metal bracket 18.

Also, a stopper cylinder portion 96 is integrally formed with the metal bracket 18 extending upward in the axial direction in an approximate shape of a cylinder from the outer fitting portion 90, and an abutting portion 98 in an annular shape is formed around the top opening rim of the stopper cylinder portion 96 extending inward in the radial direction. This abutting portion 98 is located above the stopper portion 26 of the first mounting member 12 face to face with each other at a distance. The stopper portion 26 and abutting portion 98, under installation by mounting to the vehicular body, are arranged opposite to each other at a certain distance in the axial direction with the main rubber elastic body 16 deformed by pressure by a given amount, and when a large tensile load is inputted to separate the first mounting member 12 and second mounting member 14 from each other, the stopper portion 26 and abutting portion 98 hit against each other via the cushion rubber 30 so that the relative displacement of the power unit attached to the first mounting member 12 against the vehicular body attached to the second mounting member 14 is restricted in a buffering manner.

In the engine mount 10 structured as described above, the inward protrusion 34 is formed at the insertion metal fitting 32. This increases the bonding area between the inner surface 40 of the insertion metal fitting 32 and the main rubber elastic body 16, thus increasing the area of the main rubber elastic body 16 to be constrained by the insertion metal fitting 32. Therefore, when a tensile load is exerted in a direction of separating the first mounting member 12 and second mounting member 14 from each other, the tensile spring force of the main rubber elastic body 16 can be enhanced by the constraint over the main rubber elastic body 16 by the insertion metal fitting 32. Especially, by virtue of the inward protrusion 34, the main rubber elastic body 16 is fixed to the inner surface 40 of the inward protrusion 34 by its transaxial component. Thus, an effective constraining force is exerted against upward deformation in the axial direction when a tensile load is applied so that the tensile spring force is favorably exerted with an enhanced effect.

Then, the inward protrusion 34 is formed at the bottom portion in the axial direction of the insertion metal fitting 32, and the main rubber elastic body 16 is constrained at its bottom portion in the axial direction. Therefore, even when an excessive tensile load is applied to the main rubber elastic body 16, any uplift of the abutting portion 42 in response to the tensile load as shown by dashed lines in FIG. 2 can be favorably prevented, thus reducing the striking noise against the partition member 56 caused by the abutting portion 42 returning from the uplifted position.

Further, the sealing rubber storage space 88 is formed between the inward protrusion 34 and second mounting member 14. This allows the sealing rubber 54, which is pressed between the partition member 56 as well as insertion metal fitting 32 and the second mounting member 14, to be let out into the sealing rubber storage space 88 when the integrally vulcanization molded component of the partition member 56 and the main rubber elastic body 16 is inserted into the second mounting member 14 to subject itself to a diameter reduction process. Therefore, in applying the diameter reduction process to the second mounting member 14, the sealing rubber 54 is allowed to have enough compressive deformation, thus preventing an excessive compression force caused by entrapment of the non-compressible sealing rubber 54 from being exerted on the insertion metal fitting 32. As a result, the insertion metal fitting 32 can be deformed more evenly in the axial direction in the process of reducing the diameter of the second mounting member 14, and the space between the second mounting member 14 and insertion metal fitting 32 can be made more even in the axial direction. Therefore, the sealing rubber 54 can be clamped between the second mounting member 14 and insertion metal fitting 32 with a given tightening allowance, which enhances the sealing performance. Especially in this embodiment, since the sealing rubber storage space 88 is formed at the bottom of the insertion metal fitting 32 in the axial direction at a location where the insertion metal fitting 32 overlaps with the partition member 56, the sealing rubber 54 escaped from the portion compressed between the insertion metal fitting 32 and second mounting member 14 as well as the portion compressed between the partition member 56 and the second mounting member 14 can both effectively be absorbed.

Figure 3:
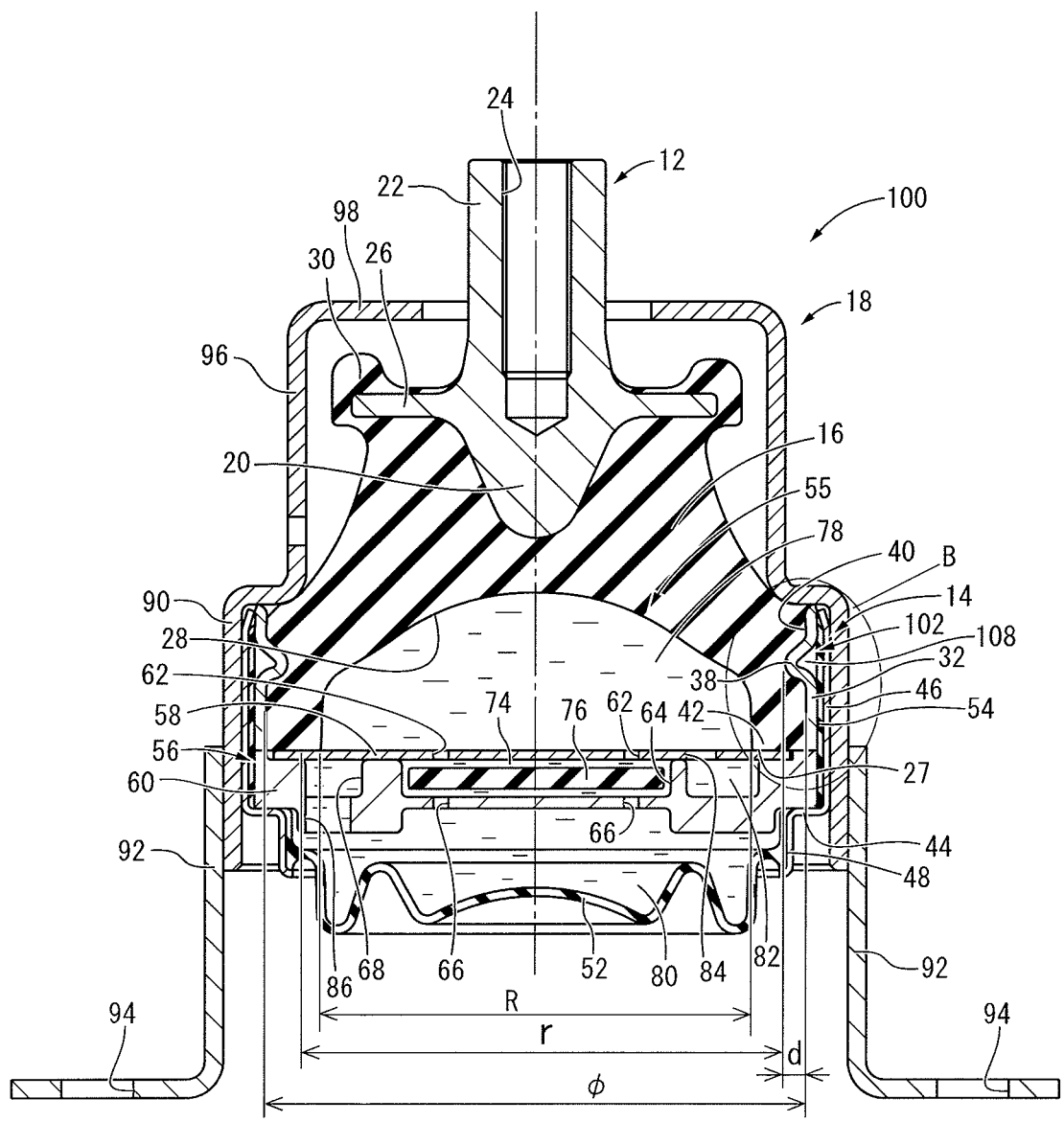
FIG. 3 is an elevational view in axial or vertical cross section of an engine mount as a second embodiment of the present invention.

Next, FIG. 3 shows an engine mount 100 relating to a fluid filled vibration damping device as a second embodiment of the present invention. In this embodiment, since a similar structure to that of the engine mount 10 as the first embodiment can be adopted except for the structure of the insertion metal fitting, descriptions are omitted for the portions or members substantially the same as those of the first embodiment described above by denoting them by the same reference numbers.

Figure 4:
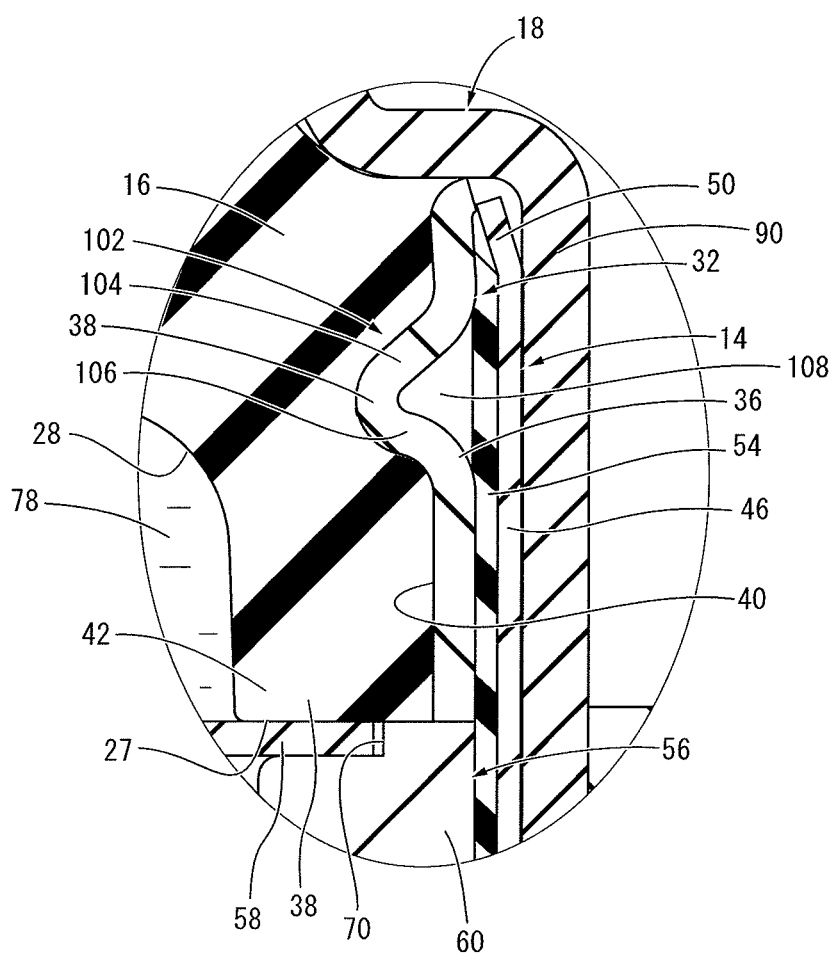
FIG. 4 is an enlarged view of Part B in FIG. 3.

In this embodiment, an inward protrusion 102 is formed in the middle portion of the insertion metal fitting 32 in the axial direction. As shown in the enlarged view of FIG. 4, the inward protrusion 102 is formed with a depression on the inside of the insertion metal fitting 32 in the middle portion thereof in the axial direction, and an upper tapered portion 104 that slopes inward as it descends from the top down in the axial direction and a lower tapered portion 106 that slopes inward as it ascends from the bottom up in the axial direction. The inward protrusion 102 is formed all around the circumference of the insertion metal fitting 32. This allows a sealing rubber storage space 108 of this embodiment to be continuously formed all around the circumference of the insertion metal fitting 32 in the middle portion thereof in the axial direction between the inward protrusion 102 and the larger-diameter portion 46 of the second mounting member 14.

In the engine mount 100 structured as described above, the tensile spring force of the main rubber elastic body 16 can be enhanced by having the upper tapered portion 104 of the inward protrusion 102 protrude inward of the insertion metal fitting 32 to be fixed to the main rubber elastic body 16. Thus, in this embodiment, the formation of the upper tapered portion 104 makes the inward protrusion 102 in a tapered shape. In addition, the formation of the lower tapered portion 106 together with the upper tapered portion 104 causes the lower tapered portion 106 as well to exert a force of constraint against upward deformation of the main rubber elastic body 16, thus further enhancing the tensile spring force thereof.

Also in this embodiment, by forming the sealing rubber storage space 108 between the inward protrusion 102 and second mounting member 14, the sealing rubber 54 compressed between the insertion metal fitting 32 and second mounting member 14 can be let out into the sealing rubber storage space 108. Especially in this embodiment, since the inward protrusion 102 is made in a tapered shape at the upper tapered portion 104 and lower tapered portion 106 that protrude inward while sloping in the axial direction, a variation in the local rigidity of the insertion metal fitting 32 is reduced as compared to having it protrude out in a straight line in the transaxial direction. This will reduce the risk of the insertion metal fitting 32 being locally deformed and degrading the sealing performance in the process of reducing the diameter of the second mounting member 14.

Embodiments of the present invention have been described in detail above, but the present invention is not limited by those specific descriptions. For example, the specific shape of the inward protrusion 34, 102 is not limited to those of the embodiments described above and does not have to be an inward protrusion in a tapered shape, but it can be an inward protrusion with a cross-section of hooked straight lines or arc lines such as those of a semicircle. Also, as to the location of the inward protrusion, it can be formed anywhere in the axial direction of the insertion metal fitting 32. Further, the inward protrusion can be provided separately in the circumferential direction of the insertion metal fitting 32, or it can be formed in multiple locations in the axial direction of the insertion metal fitting 32.

Also, the orifice passage 82 and the liquid absorption mechanism by the rubber plate 76 and the like in the embodiments described above are just examples and not limited to such structures. For example, a plurality of orifice passages can be formed to be able to switch between open and shut states thereof depending on the frequency of the input vibration, or the input vibration can be offset with an active exertion of oscillation force by an electromagnetic or air pressure-type actuator. Further, the liquid pressure absorption mechanism is not necessarily required.

Also, the vibration damping device relating to the present invention is not limited to that used as an engine mount, but can be used, for example, as a body mount, a sub-frame mount or a differential mount. In addition, the scope of application of the present invention is not limited to vibration damping devices for motor vehicles but also extends favorably to vibration damping devices for motorcycles, railroad vehicles, and industrial vehicles.

What is claimed is:

1. A fluid filled vibration damping device comprising:
 a first mounting member;
 a second mounting member having a cylindrical portion;
 a main rubber elastic body elastically connecting the first and second mounting members;
 a partition member supported by the second mounting member;
 a pressure-receiving chamber in which a non-compressible fluid is sealed that is located on one side across from the partition member and whose wall is partially defined by the main rubber elastic body;
 an equilibrium chamber in which the non-compressible fluid is sealed that is located on another side across from the partition member and whose wall is partially defined by a flexible film; and
 an orifice passage that connects the pressure-receiving chamber and the equilibrium chamber to each other,
 wherein the first mounting member is fixed to one end of the main rubber elastic body, and an insertion metal fitting in a cylindrical shape is fixed onto an outer peripheral face of another end thereof, and the cylindrical portion of the second mounting member is bonded by pressure to the insertion metal fitting with a sealing rubber in between in a fluid-tight manner,
 wherein the insertion metal fitting is provided with an inward protrusion where part of a wall portion protrudes inward, and
 wherein a sealing rubber storage space is formed between the inward protrusion and the cylindrical portion of the second mounting member.

2. The fluid filled vibration damping device according to claim 1, wherein the inward protrusion of the insertion metal fitting is formed in a tapered shape extending inward while sloping in an axial direction of the insertion metal fitting.

3. The fluid filled vibration damping device according to claim 2, wherein the inward protrusion in the tapered shape is provided at an end of the insertion metal fitting in the axial direction thereof on a side away from the first mounting member.

4. The fluid filled vibration damping device according to claim 1, wherein in a transaxial direction of the insertion metal fitting, a protruding length at a protruded end of the inward protrusion is set within a range of 3 to 15% of an inner diameter of the insertion metal fitting.

5. The fluid filled vibration damping device according to claim 1, wherein a volume of the sealing rubber storage space is made at least 3% of a volume of the sealing rubber clamped between the cylindrical portion of the second mounting member and the insertion metal fitting.

\* \* \* \* \*